United States Patent
Rigoni et al.

(10) Patent No.: US 11,169,877 B2
(45) Date of Patent: *Nov. 9, 2021

(54) NON-VOLATILE MEMORY DATA AND ADDRESS ENCODING FOR SAFETY COVERAGE

(71) Applicant: Allegro MicroSystems, LLC, Manchester, NH (US)

(72) Inventors: Nicolas Rigoni, Buenos Aires (AR); Nicolás Rafael Biberidis, Barcelona (ES); Ahmed Hassan Fahmy, Methuen, MA (US); Octavio H. Alpago, Buenos Aires (AR)

(73) Assignee: Allegro MicroSystems, LLC, Manchester, NH (US)

(*) Notice: Subject to any disclaimer, the term of this patent is extended or adjusted under 35 U.S.C. 154(b) by 0 days.

This patent is subject to a terminal disclaimer.

(21) Appl. No.: 16/821,155

(22) Filed: Mar. 17, 2020

(65) Prior Publication Data

US 2021/0294694 A1 Sep. 23, 2021

(51) Int. Cl.
 *G06F 11/10* (2006.01)
 *G06F 3/06* (2006.01)
(52) U.S. Cl.
 CPC .......... *G06F 11/1068* (2013.01); *G06F 3/068* (2013.01); *G06F 3/0619* (2013.01); *G06F 3/0659* (2013.01)
(58) Field of Classification Search
 CPC .. G06F 11/1068; G06F 3/0619; G06F 3/0659; G06F 3/068
 See application file for complete search history.

(56) References Cited

U.S. PATENT DOCUMENTS

| | | |
|---|---|---|
| 7,573,112 B2 | 8/2009 | Taylor |
| 7,633,115 B2 | 12/2009 | Wang |
| 7,676,914 B2 | 3/2010 | Taylor |
| 7,687,882 B2 | 3/2010 | Taylor et al. |
| 7,715,219 B2 | 5/2010 | Monreal |
| 8,093,670 B2 | 1/2012 | Taylor |
| 8,736,260 B2 | 5/2014 | Foletto et al. |
| 9,184,012 B2 | 11/2015 | Wang |

(Continued)

OTHER PUBLICATIONS

U.S. Appl. No. 16/695,968, filed Nov. 26, 2019, Rigoni et al.
U.S. Appl. No. 16/782,139, filed Feb. 5, 2020, Sarwar et al.
U.S. Appl. No. 16/822,119, filed Mar. 18, 2020, Sarwar et al.

*Primary Examiner* — Guy J Lamarre
(74) *Attorney, Agent, or Firm* — Daly, Crowley, Mofford & Durkee, LLP

(57) ABSTRACT

A method is disclosed for use in an electronic device having a non-volatile storage device and a volatile storage device, the method comprising: retrieving a first encoded data packet from a first address in the non-volatile storage device; decoding the first encoded data packet to obtain a first data item and a first error code corresponding to the first data item, the first encoded data packet being decoded by using a first coding key that is associated with the first address; detecting whether the first data item is corrupt based on the first error code and an error correction function, storing the first data item at a first address in the volatile storage device when the first data item is not corrupt, and transitioning the electronic device into a safe state when the first data item is corrupt.

20 Claims, 7 Drawing Sheets

(56) References Cited

U.S. PATENT DOCUMENTS

| | | |
|---|---|---|
| 9,395,391 B2 | 7/2016 | Fernandez et al. |
| 9,476,899 B2 | 10/2016 | Fernandez et al. |
| 9,625,534 B2 | 4/2017 | Cadugan et al. |
| 9,644,999 B2 | 5/2017 | Foletto et al. |
| 10,038,001 B1 | 7/2018 | Wang |
| 10,066,965 B2 | 9/2018 | Foletto et al. |
| 10,297,605 B2 | 5/2019 | Wang |
| 10,411,498 B2 | 9/2019 | Shoemaker et al. |
| 10,430,296 B2 | 10/2019 | Cesaretti et al. |
| 10,635,539 B2 | 4/2020 | Cook et al. |
| 10,706,948 B2 * | 7/2020 | Biberidis ............ G11C 29/4401 |
| 2004/0243906 A1 * | 12/2004 | Huang ................ G06F 11/1068 |
| | | 714/758 |
| 2010/0005375 A1 * | 1/2010 | Dell ........................ G06F 11/10 |
| | | 714/807 |
| 2010/0052424 A1 | 3/2010 | Taylor et al. |
| 2010/0052852 A1 * | 3/2010 | Mohanty ................ G07C 9/257 |
| | | 340/5.83 |
| 2011/0307758 A1 * | 12/2011 | Fillingim ............ G06F 11/1048 |
| | | 714/758 |
| 2013/0315584 A1 * | 11/2013 | Hosking ................ H04B 10/40 |
| | | 398/25 |
| 2015/0114764 A1 * | 4/2015 | Taylor ................... B66B 5/0031 |
| | | 187/393 |
| 2016/0231393 A1 | 8/2016 | Fernandez et al. |
| 2018/0259594 A1 | 9/2018 | Fernandez et al. |
| 2018/0314627 A1 * | 11/2018 | Orme ................... G06F 12/0238 |
| 2019/0250859 A1 * | 8/2019 | Greene ................... H04L 67/12 |
| 2019/0370125 A1 | 12/2019 | Cesaretti et al. |
| 2019/0371415 A1 | 12/2019 | Cesaretti et al. |
| 2020/0020412 A1 | 1/2020 | Biberidis et al. |

\* cited by examiner

| ADDRESS (dec) | ADDRESS (bin) | HASHING VECTOR 500 |
|---|---|---|
| 0 | 0000 0000 | 0000 0000 0000 0001 |
| 1 | 0000 0001 | 0000 0000 0000 0010 |
| 2 | 0000 0010 | 0000 0000 0000 0100 |
| 3 | 0000 0011 | 0000 0000 0000 1000 |
| 4 | 0000 0100 | 0000 0000 0001 0000 |
| 5 | 0000 0101 | 0000 0000 0010 0000 |
| 6 | 0000 0110 | 0000 0000 0100 0000 |
| 7 | 0000 0111 | 0000 0000 1000 0000 |
| 8 | 0000 1000 | 0000 0001 0000 0000 |
| 9 | 0000 1001 | 0000 0010 0000 0000 |
| 10 | 0000 1010 | 0000 0100 0000 0000 |
| 11 | 0000 1011 | 0000 1000 0000 0000 |
| 12 | 0000 1100 | 0001 0000 0000 0000 |
| 13 | 0000 1101 | 0010 0000 0000 0000 |
| 14 | 0000 1110 | 0100 0000 0000 0000 |
| 15 | 0000 1111 | 1000 0000 0000 0000 |

| ADDRESS (dec) | ADDRESS (bin) | HASHING VECTOR | ADDRESS (dec) | ADDRESS (bin) |
|---|---|---|---|---|
| 0 | 0000 0000 | 0000 0000 0000 0001 | 24 | 0001 1000 |
| 1 | 0000 0001 | 0000 0000 0000 0010 | 25 | 0001 1001 |
| 2 | 0000 0010 | 0000 0000 0000 0100 | 26 | 0001 1010 |
| 3 | 0000 0011 | 0000 0000 0000 1000 | 27 | 0001 1011 |
| 4 | 0000 0100 | 0000 0000 0001 0000 | 28 | 0001 1100 |
| 5 | 0000 0101 | 0000 0000 0010 0000 | 29 | 0001 1101 |
| 6 | 0000 0110 | 0000 0000 0100 0000 | 30 | 0001 1110 |
| 7 | 0000 0111 | 0000 0000 1000 0000 | 31 | 0001 1111 |
| 8 | 0000 1000 | 0000 0001 0000 0000 | 16 | 0001 0000 |
| 9 | 0000 1001 | 0000 0010 0000 0000 | 17 | 0001 0001 |
| 10 | 0000 1010 | 0000 0100 0000 0000 | 18 | 0001 0010 |
| 11 | 0000 1011 | 0000 1000 0000 0000 | 19 | 0001 0011 |
| 12 | 0000 1100 | 0001 0000 0000 0000 | 20 | 0001 0100 |
| 13 | 0000 1101 | 0010 0000 0000 0000 | 21 | 0001 0101 |
| 14 | 0000 1110 | 0100 0000 0000 0000 | 22 | 0001 0110 |
| 15 | 0000 1111 | 1000 0000 0000 0000 | 23 | 0001 0111 |

500

NON-VOLATILE MEMORY DATA AND ADDRESS ENCODING FOR SAFETY COVERAGE

BACKGROUND

Non-volatile memory is a type of memory that can retain stored information after it is powered off. Many electronic devices including, but not limited to, automotive sensors, automotive control systems, industrial sensors, and industrial control systems, use non-volatile memory to store data.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with aspects of the concepts described herein, it has been recognized that many electronic devices which include a non-volatile memory, including not limited to automotive sensors, automotive control systems, industrial sensors, and industrial control systems are operated under harsh thermal conditions. It has also been recognized that in some applications, the ability of non-volatile memory to endure high temperatures without experiencing failure is important (and in some instances even crucial) to the safe and reliable operation of the electronic devices.

According to aspects of the disclosure, a sensor is provided comprising: a sensing element; a volatile storage device; a non-volatile storage device configured to store a plurality of encoded data packets, each of the encoded data packets being stored at a different respective address in an address space of the non-volatile storage device, at least some of the plurality of encoded data packets being encoded using a different one of a plurality of coding keys, any of the encoded data packets being encoded using a coding key that is associated with the respective address where the encoded data packet is stored; and processing circuitry operatively coupled to the sensing element, the volatile storage device, and the non-volatile storage device, wherein the processing circuitry is configured to perform the operations of: retrieving a first encoded data packet from a first address in the non-volatile storage device; decoding the first encoded data packet to obtain a first data item and a first error code corresponding to the first data item, the first encoded data packet being decoded by using a first coding key that is associated with the first address; detecting whether the first data item is corrupt based on the first error code and an error correction function, storing the first data item at a first address in the volatile storage device when the first data item is not corrupt, and transitioning the sensor into a safe state when the first data item is corrupt.

According to aspects of the disclosure, a method is provided for use in an electronic device having a non-volatile storage device and a volatile storage device, the method comprising: retrieving a first encoded data packet from a first address in the non-volatile storage device; decoding the first encoded data packet to obtain a first data item and a first error code corresponding to the first data item, the first encoded data packet being decoded by using a first coding key that is associated with the first address; detecting whether the first data item is corrupt based on the first error code and an error correction function, storing the first data item at a first address in the volatile storage device when the first data item is not corrupt, and transitioning the electronic device into a safe state when the first data item is corrupt.

According to aspects of the disclosure, a non-transitory computer-readable medium is provided that stores one or more instructions, which when executed by a processing circuitry of an electronic device cause the processing circuitry to perform the operations of: retrieving a first encoded data packet from a first address in a non-volatile storage device; decoding the first encoded data packet to obtain a first data item and a first error code corresponding to the first data item, the first encoded data packet being decoded by using a first coding key that is associated with the first address; detecting whether the first data item is corrupt based on the first error code and an error correction function, storing the first data item at a first address in a volatile storage device when the first data item is not corrupt, and transitioning the electronic device into a safe state when the first data item is corrupt.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Figure 1:
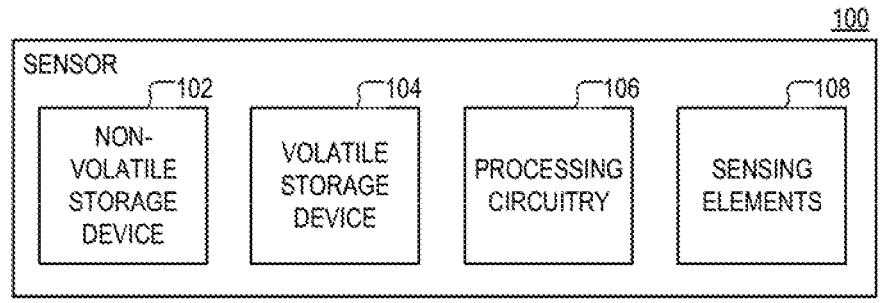
FIG. 1 is a diagram of an example of a sensor, according to aspects of the disclosure.

During a process for retrieving data from a non-volatile storage device, a processing circuitry applies an address to an address bus associated with the non-volatile storage device. If a fault or error is present or somehow introduced on the address bus. When a stuck bit (i.e., a bit stuck at '1' or '0') or another fault is present on the address bus, the non-volatile storage device may receive (or interpret or sense) an address that is different from the address being applied by the processing circuitry (e.g., the non-volatile storage device may see an address that is different from the address which the processing circuitry is applying, etc.). As a result of the fault or error (collectively referred to herein as a fault), the non-volatile storage device may output "incorrect" data—i.e., data that is stored at the sensed address, rather than data that is stored at the applied address. When the fault goes undetected, the non-volatile storage device may effectively pass the "incorrect" data as the data that is stored at the applied address. The processing circuitry may remain oblivious to the fact that it is provided with "incorrect" data, and various errors may occur when the processing circuitry attempts to use the "incorrect" data to perform operations that are designed or intended to be performed with the data stored at the applied address.

According to aspects of the disclosure, a method for storing data in non-volatile memory is disclosed. The method mitigates faults on the address bus of the non-volatile storage device, without being explicitly identified as such. According to the method, data stored at different addresses in a storage device is encoded with coding keys that are specific to the addresses, such that data stored in different addresses is encoded with different coding keys. In one implementation of the method, when a data item is stored at a given address in the non-volatile storage device, an error code for the data item is generated. The error code is added to the data item to produce a data packet. The error code may occupy the last N bits (e.g., the last 6 bits) of the data packet, and the data item may occupy the rest. The data packet is encoded with a given coding key that is associated with the given address and the encoded data packet may be stored at the given address.

When a user or processing device desires to retrieve the data item from the given address, the given address is applied to the address bus of the storage device, and a return data packet is produced in response. The return data packet is decoded with the coding key that corresponds to the given address, and an error check is subsequently carried out by using an error checking function.

When a fault has occurred on the address bus of the storage device, the return data packet may be a data packet that is stored at an address that is different from the given address. In this instance, the return data packet would be encoded with a coding key that is different from the coding key that corresponds to the given address. However, because the processing circuitry expects to receive the data packet that is stored at the given address, the processing circuitry would decode the return data packet with the coding key that corresponds to the given coding address. As can be readily appreciated, decoding the return data packet with a wrong coding key would yield invalid data (e.g., corrupt data). Accordingly, when the return data packet is decoded with the given coding key, the last N bits of the decoded data packet will no longer constitute a valid error code for the rest of the data packet, and the error check of the data packet will fail. The failure of the error check may be subsequently detected, and the data packet may be discarded in response.

The error check may be performed by using any error detection and/or error correction mechanism (e.g., error correction function) that is known in the art. Although the error check would not identify a fault on the address bus as the source of the error, the error check can effectively flag "incorrect" data and prevent the propagation of "incorrect" data within the system. In this regard, one advantage of the disclosed system and method is that it can be integrated seamlessly with existing error checking mechanisms to further extend their functionality.

FIG. 1 is a diagram of an example of a sensor 100, according to aspects of the disclosure. The sensor may include a non-volatile storage device 102, a volatile storage device 104, processing circuitry 106, and sensing element(s) 108. The non-volatile storage device 102 may include an Electronically Erasable Programmable Read-Only Memory (EEPROM) matrix and/or any other suitable type of non-volatile memory matrix. The volatile storage device 104 may include a volatile random-access memory (RAM) matrix and/or any other suitable type of volatile memory matrix. The sensing element(s) 108 may include a Hall effect element, a giant magnetoresistance (GMR) element, a tunneling magnetoresistance (TMR) element, a photodiode, a thermistor, and/or any other suitable type of transducer. The processing circuitry 106 may include any suitable type of electronic circuitry for driving one or more of the non-volatile storage device 102, the volatile storage device 104, and the sensing element(s) 108.

Figure 2:
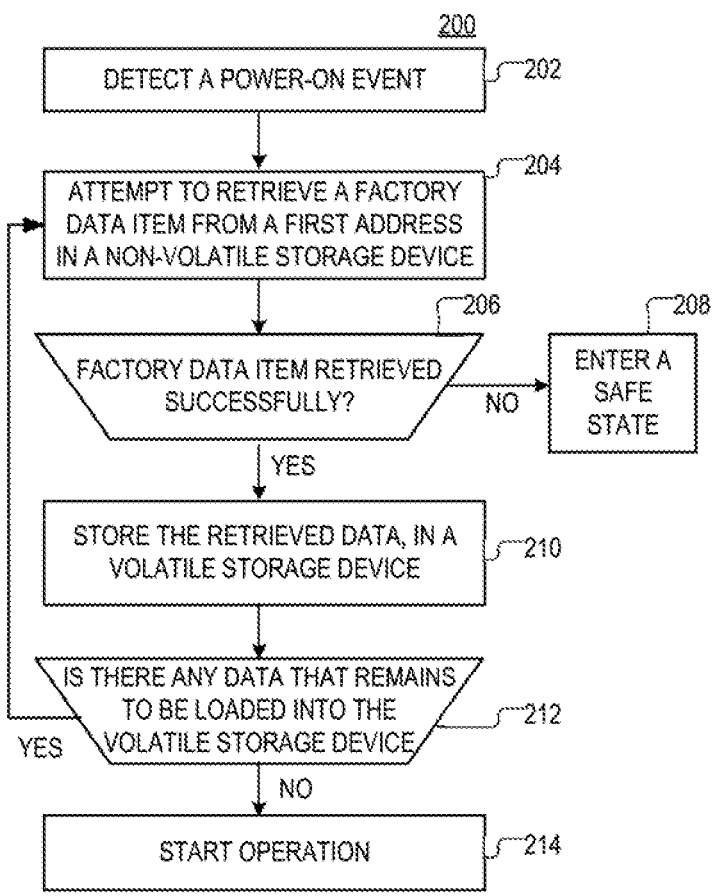
FIG. 2 is a flowchart of an example of a process, according to aspects of the disclosure.

FIG. 2 is flowchart of an example of a process 200, which is executed at boot time by the sensor 100 (i.e., when the sensor 100 is first powered on). The process 200 involves retrieving factory data from the non-volatile storage device 102 and storing the retrieved factory data into the volatile storage device 104. The factory data may include clock trim codes, bias current trims, a lot number, a wafer id, and or any other suitable type of data that may be stored in the memory of a sensor when the sensor is manufactured (e.g., before the sensor leaves the factory). After the factory data is stored in the volatile storage device 104, the copy of the factory data that is stored in the volatile storage device 104 may be used by the processing circuitry 106 in a well-known fashion (e.g., to sample signals generated by the sensing element(s) 108, produce output signals based on the sampled signals, etc.). In embodiments, the factory data may be copied from the non-volatile storage device 102 to the volatile storage device 104 to increase the speed and efficiency at which the factory data is accessed by the processing circuitry 106.

At 202, processing circuitry 106 detects a power-on event. The power-on event may include any event that is generated within the sensor 100 when the sensor 100 is first powered on.

At 204, the processing circuitry 106 attempts to retrieve a factory data item from an address in the non-volatile storage device 102. In some implementations, making the attempt to retrieve the factory data item may include: (i) outputting a read-select signal, (ii) applying the address on an address bus that is coupled to the non-volatile storage device 102, and (iii) receiving data over a data bus that is coupled to the non-volatile storage device. In some implementations, 204 may be executed as discussed further below with respect to FIGS. 10 and/or 11.

At 206, the processing circuitry 106 determines whether the attempt to retrieve the factory data item is successful. In some implementations, the processing circuitry may execute an error detection process to detect whether data returned by the non-volatile storage device 102 is corrupt. If the data is corrupt, the attempt is considered unsuccessful and the process 200 proceeds to 210. Otherwise, if data is not corrupt, the attempt is considered successful, and the process 200 proceeds to 212. In some implementations, the error detection process may include any suitable type of error checking process that is known in the art, such as cyclical redundancy check (CRC) process or a checksum process. Throughout the disclosure, the term "error checking function" and "error checking process" are used interchangeably, as indicated by context. For example, an error checking function, such as a CRC function, may take as input a string and an error code associated with the string and yield an error when the error code doesn't match the string. Although CRC is herein used as an example of an error checking function, it will be understood that other types of error checking functions, such as checksum functions or an XOR function, can also be used instead.

At 208, the processing circuitry 106 transitions the sensor 100 into a safe state. In some implementations, transitioning into a safe state may include repeating the attempt to retrieve the factory data item. Additionally or alternatively, in some implementations, transitioning into the safe state may include outputting an error signal. Additionally or alternatively, in some implementations, transitioning into the safe state may include powering the sensor on and off. Stated succinctly, the present disclosure is not limited to taking any specific action when the attempt to retrieve the factory data item is unsuccessful.

At 210, the factory data item is stored at a second address in the volatile storage device 104. In some implementations, the second address may be an address that is designated for storing factory data item. Additionally or alternatively, the second address in the volatile storage device 104 may be an addresses that is mapped to the first address in the non-volatile storage device 102 by a data structure or other logic that is implemented by (or executed on) the processing circuitry 106.

At 212, a determination is made if there are other factory data items that remain to be loaded into the volatile storage device 104. If there are factory data items that remain to be loaded into the volatile storage device 104, the process 200 returns to 204, and steps 204-210 are repeated for another data item. Otherwise, if there are no other factory data items that remain to be loaded into the volatile storage device 104, the process 200 proceeds to 214. In some implementations, the process 200 may be arranged to process each and every address in the memory space of the non-volatile storage device 102. In such implementations, each and every data item that is stored in the non-volatile storage device 102 can be loaded and copied onto the volatile storage device 104.

At 214, the processing circuitry 106 begins its normal operation. The normal operation of the processing circuitry may include sampling one or more signals that are produced by the sensing element(s) 108 and generating one or more output signals that are generated based on the sampled signals. As can be readily appreciated, the output signals may indicate a level (or intensity) of a stimulus which the sensing element(s) 108 are arranged to sense, such as magnetic field direction, magnetic field magnitude, light intensity, etc. The output signals may be generated, at least in part, based on factory data that is loaded into the non-volatile storage device 104 as a result of executing steps 204-212.

Figure 3:
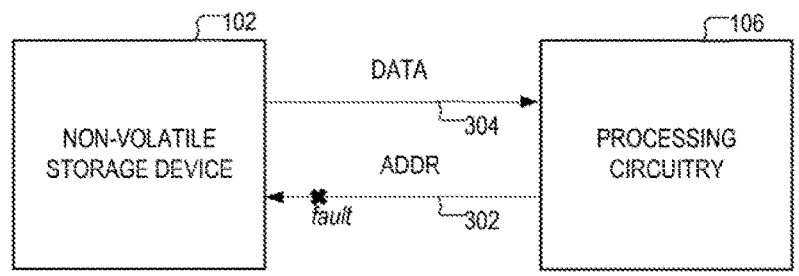
FIG. 3 is a diagram illustrating the occurrence of a fault on the address bus of a non-volatile storage device, according to aspects of the disclosure.

FIG. 3 is a schematic diagram illustrating a fault, which might lead to incorrect factory data being loaded onto the volatile storage device 104. As illustrated, the processing circuitry 106 may be coupled to the non-volatile storage device via an address bus 302 and a data bus 304. In operation, when the processing circuitry wants to retrieve a factory data item from a given address in the non-volatile storage device 102, the processing circuitry 106 may apply the given address on the address bus 302 and receive the factory data item over data bus 304.

Occasionally, a stuck bit or another fault may occur on the address bus 302, which could cause the non-volatile storage device 102 to sense an address that is different from the address that is being applied by the processing circuitry 106. As a result of the fault, the non-volatile storage device 102 may output a factory data item that is stored at the sensed address (herein referred to as "incorrect data"), rather than data that is stored at the applied address. If the fault is not detected, the processing circuitry 106 may store the incorrect data at a location in the volatile storage device 104 that is designated for storing the factory data item and begin using the incorrect data in place of the factory data item. As can be readily appreciated, using the incorrect data instead of the factory data item can lead to various errors in the operation of the sensor 100, and is highly undesirable.

Figure 4:
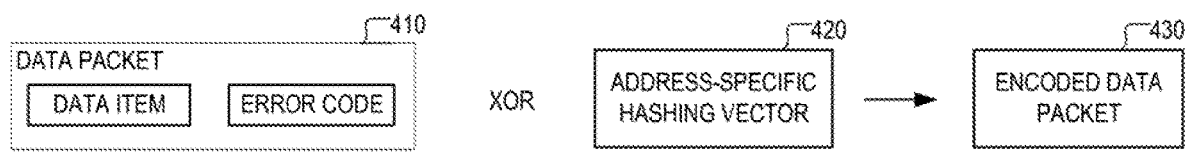
FIG. 4 is a diagram illustrating a process for encoding data packets, according to aspects of the disclosure.

FIG. 4 is schematic diagram illustrating a data encoding process, which allows incorrect data returned by the non-volatile storage device 102 to be detected and discarded. The incorrect data may be data that is returned as a result of the fault discussed above with respect to FIG. 3. According to the process, when a data item (e.g., a factory data item) is stored at a given address the non-volatile storage device 102, a data packet 410 may be generated that includes the data item and an error code that is generated based on the data item. The error code may include any suitable type of error correction and/or error detection code, such as a cyclical redundancy check (CRC) code, a checksum code, etc. Next, the data packet 410 is a XOR-ed with a hashing vector 420 to produce an encoded data packet 430, which is subsequently stored at the given address in the non-volatile storage device 102. As can be readily appreciated, when the encoded data packet 430 is retrieved from the non-volatile storage device 102, the encoded data packet 430 may be decoded by XOR-ing the encoded data packet 430 with the hashing vector 420.

In some implementations, at least some of the addresses in the non-volatile storage device 102 may be associated with different hashing vectors. As noted above, when a fault occurs on the address bus 302, an encoded data packet may be returned that is stored at an address (i.e., a sensed address) that is different from the address that is being applied on the address bus 302 by the processing circuitry 106. The encoded data packet may be encoded using a first hashing vector that is associated with the sensed address, and which is different from a second hashing vector that is associated with the applied address. However, because the processing circuitry 106 expects to receive an encoded data item that is stored at the applied address, the processing circuitry may attempt to decode the received encoded data packet with the second hashing vector, which would yield decoded data that is invalid. As noted above, such decoded would not pass a subsequent error check and can be discarded safely without making its way further into the system.

Figures 5, 6:
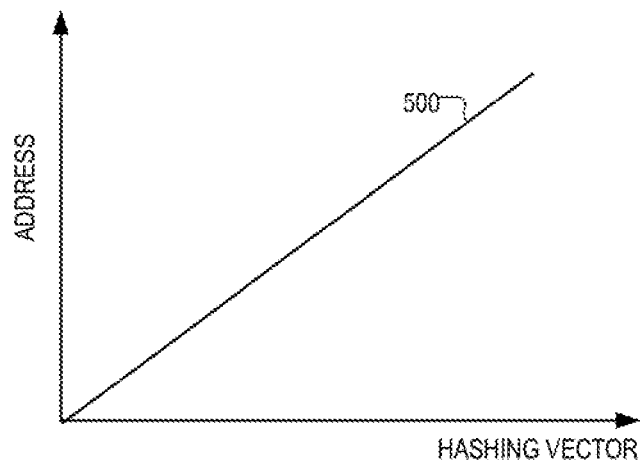
FIG. 5 is a plot of a mapping function, according to aspects of the disclosure.
FIG. 6 is a tabular representation of the mapping function of FIG. 5, according to aspects of the disclosure.

FIG. 5 is a plot of a one-to-one mapping function 500, which maps each of the addresses in an address space of the non-volatile storage device 102 to a different hashing vector. FIG. 6 shows a tabular representation of the same function. As illustrated, the mapping function 500 maps each of a plurality of hashing vectors to a different one of the addresses in the address space of the non-volatile storage device 102, such that only one address is mapped to any of the hashing vectors. According to the example of FIGS. 5-6, each of the hashing vectors is a one-hot bit string. Furthermore, according to the example of FIGS. 5-6, the size of each of the hashing vectors is the same as the word size of the non-volatile storage device 102 (e.g., 16 bits, etc.), and the address space of the non-volatile storage device includes 16 addresses. However, it will be understood that alternative implementations are possible in which the address space of the non-volatile storage device 102 has a different size (e.g., 32 addresses, 64 addresses, etc.) Furthermore, it will be understood that alternative implementations are possible in which the non-volatile storage device 102 has a different word size (e.g., 32 bits, 64 bits, etc.).

Figures 7, 8:
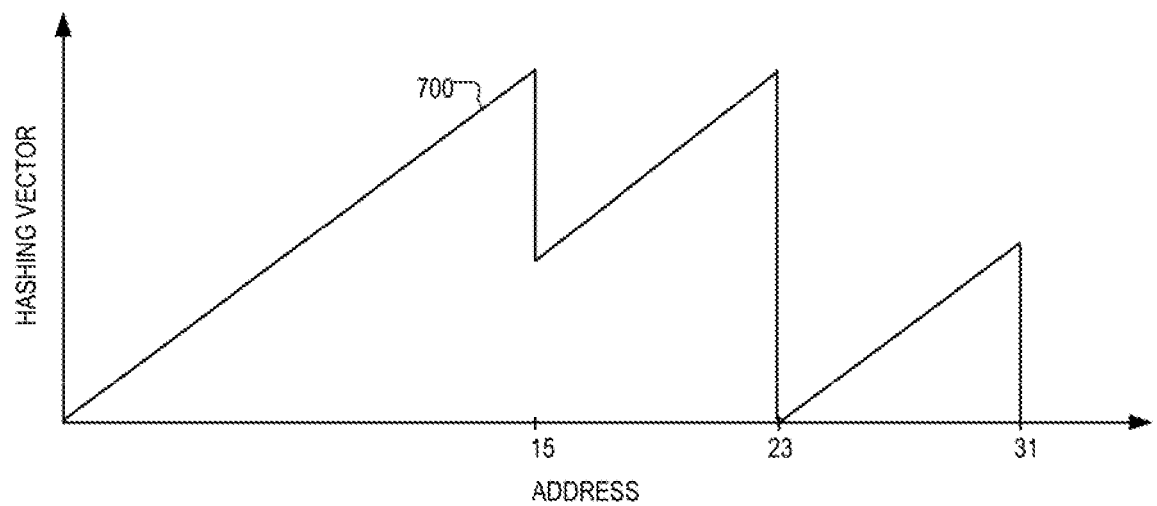
FIG. 7 is a plot of a mapping function, according to aspects of the disclosure.
FIG. 8 is a tabular representation of the mapping function of FIG. 5, according to aspects of the disclosure.

FIG. 7 is an approximate plot of a many-to-one mapping function 700, which maps each of the addresses in the address space of the non-volatile storage device 102 to a respective hashing vector. FIG. 7 shows that multiple addresses can be mapped to the same hashing vector. Using a many-to-one mapping function is advantageous because it can help reduce the space of hashing vectors that are used to hash different addresses. FIG. 8 shows a tabular representation of a portion of the same function. The plot in FIG. 7 is provided for illustrative purposes As illustrated in FIG. 7, the mapping function 700 maps each of a plurality of hashing vectors to an address in the address space of the non-volatile storage device, such that at least one of the hashing vectors is mapped to multiple addresses.

In the example of FIGS. 7-8, each of the hashing vectors is a one-hot bit string. Furthermore, in the example of FIGS. 7-8, the size of each of the hashing vectors is the same as the word size of the non-volatile storage device 102 (e.g., 16 bits, etc.), and the address space of the non-volatile storage device includes 16 addresses. However, it will be understood that alternative implementations are possible in which the address space of the non-volatile storage device 102 has a different size (e.g., 32 addresses, 64 addresses, etc.) Furthermore, it will be understood that alternative implementations are possible in which the non-volatile storage device 102 has a different word size (e.g., 32 bits, 64 bits, etc.).

In some implementations, a Hamming distance between any two addresses that are mapped to the same hashing vector (by mapping function 700) may be greater than 1. Imparting such Hamming distance may reduce the probability of collisions between the two addresses. A collision between two addresses (that are mapped to the same hashing vector) may occur when an error on the address bus of the non-volatile storage device 102 causes the non-volatile device to sense one of the addresses when the other address is being applied on the address bus of the non-volatile storage device. As can be readily appreciated by looking at FIG. 7, because two addresses are mapped to the same hashing vector, the data stored at either of the addresses is encoded with the same hashing vector. Accordingly, when a collision occurs, "incorrect" data would not be flagged by any error checks that are performed (unless the data is corrupted by a different fault), leaving the processing circuitry 106 oblivious to the fact that it has been provided with incorrect data by the non-volatile storage device 102.

In some implementations, any of the mapping functions 500 and 700 may be implemented as a data structure that is accessible by the processing circuitry 106. The data structure may be stored in the non-volatile storage device 102 or at a different location. In operation, when the processing circuitry 106 desires to store a data packet at a given address, the processing circuitry 106 may perform a search of the data structure to retrieve the hashing vector that corresponds to the address. The processing circuitry 106 may subsequently encode the data packet with the retrieve hashing vector before the encoded data packet is stored at the given address. Similarly, when the processing circuitry 106 desires to retrieve a data packet from a given address, the processing circuitry 106 may perform a search of the data structure to retrieve the hashing vector that corresponds to the given address. The processing circuitry 106 may subsequently decode the data packet with the hashing vector after the data packet is retrieved from the given address. In some respects, the mapping function 500 may be used when the size of the address space of the non-volatile storage device 102 is the same or smaller than the size of the space of available hashing vectors. By contrast, the mapping function 700 may be used when the size of the address space of the non-volatile storage device 102 is greater than the size of the space of available hashing vectors.

Figure 9:
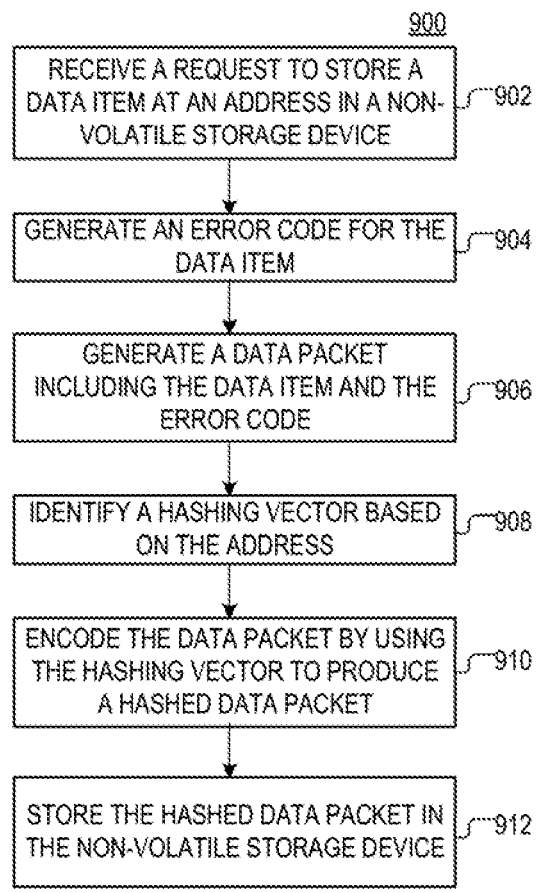
FIG. 9 is a flowchart of an example of a process, according to aspects of the disclosure.

FIG. 9 is a flowchart of an example of a process 900 for storing data in a non-volatile storage device, according to aspects of the disclosure. At 902, a request to store a data item is received. The request specifies a destination address in the non-volatile storage device, where the data item is desired to be stored. At 904, an error code is generated for the data item. The error code may include a cyclical redundancy check (CRC) code, a checksum code, a hash, and/or any other suitable type of error correction or error detection code. At 906, the error code is appended at the end of the data item to produce a data packet. At 908, a hashing vector is identified that corresponds to the destination address. In some implementations, the hashing vector may be identified by using a mapping function, such as any of the mapping functions 500 and 700, which are discussed above with respect to FIGS. 5-8. At 910, the data packet is encoded with the hashing vector to produce an encoded data packet. In some implementations, the data packet may be encoded by XOR-ing the data packet with the hashing vector. At 912, the encoded data packet is stored at the destination address in the non-volatile storage device.

Figure 10:
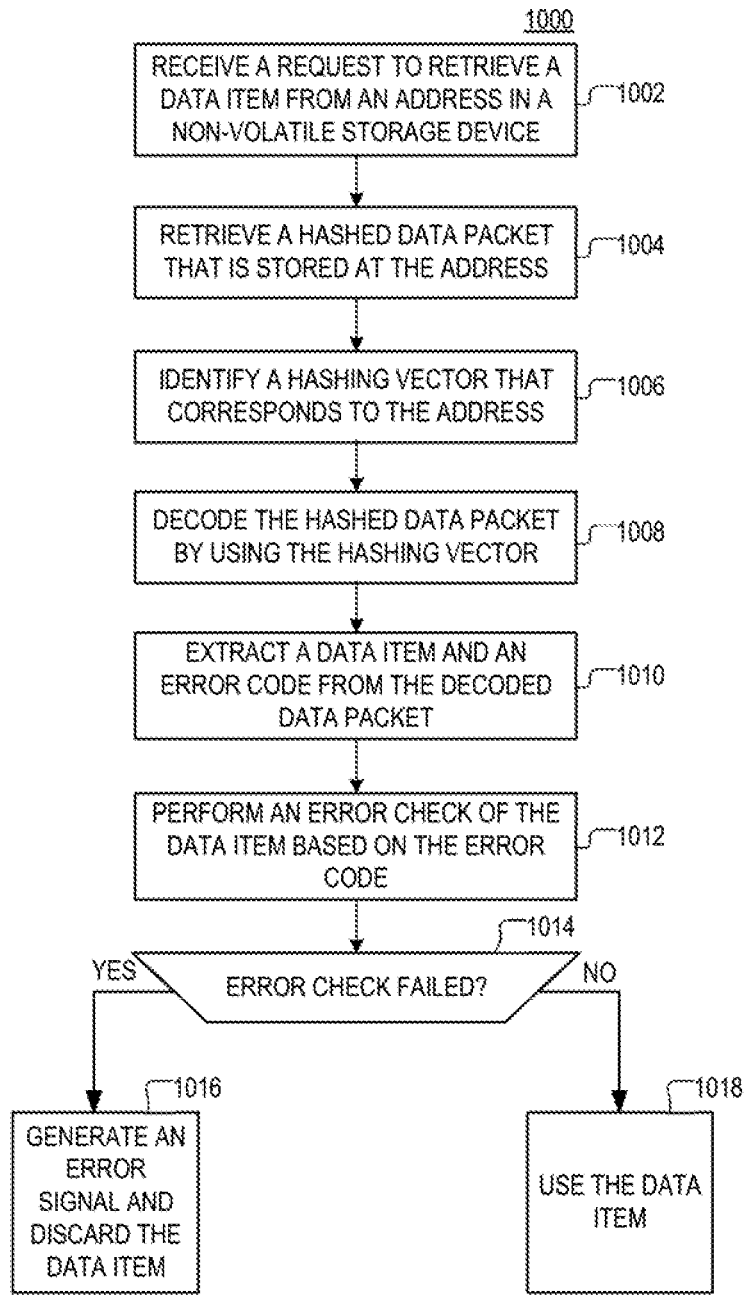
FIG. 10 is a flowchart of an example of a process, according to aspects of the disclosure.

FIG. 10 is a flowchart of an example of a process 900 for retrieving data from a non-volatile storage device, according to aspects of the disclosure. The retrieved data may be data that is stored in the non-volatile storage device in accordance with the process 900, which is discussed above with respect to FIG. 9. At 1002, a request to retrieve a data item from the non-volatile storage device is received. In some implementations, the request may specify a source address from where the data item is desired to be retrieved. At 1004, an encoded data packet is retrieved from the source address in the non-volatile storage device. At 1006, a hashing vector is identified that corresponds to the source address. In some implementations, the hashing vector may be identified by using a mapping function, such as any of the mapping functions 500 and 700, which are discussed above with respect to FIGS. 5-8. At 1008, the encoded data packet is decoded by using the hashing vector to produce a decoded data packet. At 1010, an error code and a data item are extracted from the data packet. At 1012, an error check is performed on the data item based on the error code. As noted above, the error check may yield an error when "incorrect" data is returned by the non-volatile storage, as well as when the first data item is corrupted as a result of some other fault. In some implementations, the error check may be arranged to detect dual bit error conditions in addition to single-bit error conditions. At 1014, a determination is made if the data item has failed the error check. If the error check is failed, the process 1000 proceeds to 1016. Otherwise, if the error check is not failed the process 1000 proceeds to 1018. At 1016, an error signal is generated, and the data item is discarded. At 1012, the retrieval ofthe data item is deemed successful, and the data item is used as needed.

According to aspects of the disclosure, processes 900-1000 implement the technique discussed above with respect to FIGS. 1-8. Although FIGS. 1-8 are presented in the context of a digital sensor device, it will be understood that the application of processes 900-1000 extends beyond the realm of storage devices that are built into sensors (and/or other special-purpose integrated circuits). In this regard, it will be understood that the process 900 can be executed with respect to any suitable type of storage device, such as non-volatile RAM devices, Solid-State Drives (SSDs), etc. Furthermore, it will be understood that the phrase "receiving a request to perform an action" shall be interpreted broadly to refer to receiving any suitable type of information, which when received causes the action to be performed. For example, the phrase "receiving a request to perform an action" may refer to receiving one or more hardware-level signals which cause the action to be performed (e.g., an operation-select signal, an address signal, and/or a data signal). Alternatively, in some implementations, the phrase "receiving a request to perform an action" may refer to receiving an opcode, which causes one or more hardware-level signals to be generated.

Figure 11:
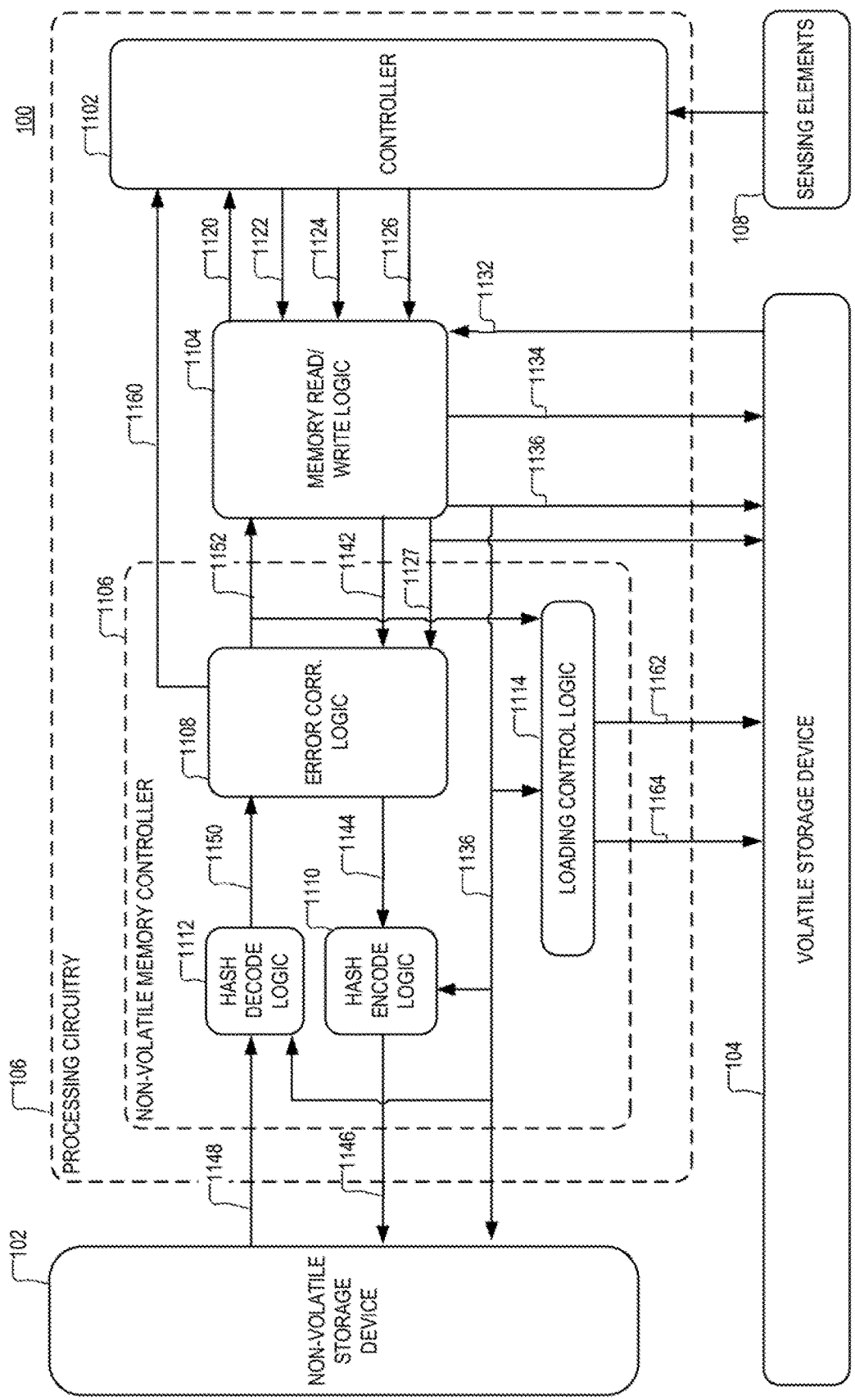
FIG. 11 is a diagram of an example of a sensor, according to aspects of the disclosure.

FIG. 11 shows an example of one implementation of the sensor 100, according to aspects of the disclosure. As illustrated, in this implementation, the processing circuitry 106 may include a controller 1102, a memory read/read write logic 1104, and a non-volatile memory controller 1106. The controller 1102 may include any suitable type of electronic circuitry that is configured to read and write data to the non-volatile storage device 102 and the volatile storage device 104. In addition, the controller 1102 may include any suitable type of electronic circuitry that is configured to sample signals produced by the sensing element(s) 108 and generate output signals (not shown) based on the sampled signals. The memory read/write logic 1104 may include any suitable type of electronic circuitry that is configured to read and write data to the non-volatile storage device 102 and the volatile storage device 104 in response to signals received from the controller 1102. The non-volatile memory controller 1106 may include any suitable type of electronic circuitry that is configured to read and write data to the non-volatile storage device 102 in response to signals provided from the memory read/write logic 1104.

The non-volatile memory controller 1106 may include an error correction logic 1108, a hash encode logic 1110, a hash decode logic 1112, and a loading control logic 1114. The error correction logic 1108 may include any suitable type of electronic circuitry that is configured to: receive a data item from the memory read/write logic 1104, generate an error code for the data item, and provide the data item and the error code to the hash encode logic 1110. As can be readily appreciated, the error checking logic may be configured to implement an error correction function, such as a CRC function, a Single Error Correction Double Error Detection (SECDEC) function, a checksum function, etc. The hash encode logic may include any suitable type of electronic circuitry that is configured to: receive an address from the memory read/write logic 1104, receive a data item and an error code for the data item from the error correction logic 1108, identify a hashing vector associated with the address by using a mapping function such as one of the mapping functions 500 or 700, use the hashing vector to encode the data item and error code to produce an encoded data packet, and store the data packet in the non-volatile storage device 102.

The hash decode logic 1112 may include any suitable type of processing circuitry that is configured to receive an address from the memory read/write logic 1104, retrieve an encoded data packet that is stored at the address, identify a hashing vector associated with the address by using a mapping function such as one of the mapping functions 500 or 700, decode the encoded data packet with the hashing vector to obtain a data item and an error code corresponding to the data item, and provide the data item and error code to the error correction logic 1108. The error correction logic 1108 may further include any suitable type of electronic circuitry that is configured to: receive a data item and an error code from the hash decode logic 1112, detect whether the data item is corrupt based on the error code, provide the controller 1102 with an error signal in response to detecting that the data item is corrupt, and provide the loading control logic 1114 with the data item in response to detecting that the data item is not corrupt. The loading control logic 1114 may include any suitable type of electronic circuitry that is configured to: receive a data item from the error correction logic 1108 and store the received data item in the volatile storage device 104.

The execution of a write operation on the volatile storage device 104 is now described in further detail. When the controller 1102 attempts to store data at a destination address in the volatile storage device 104, the controller 1102 may: apply a write-enable signal on control bus 1126, apply the data on write-data bus 1122, and apply the destination address on address bus 1124. Next, the memory read/write logic 1104 may: sense the destination address that is applied on address bus 1124, sense the data that is applied on write-data bus 1122, and sense the write-enable signal that is applied on control bus 1126. Next, the memory read/write logic 1104 may further: apply the destination address on address bus 1136, apply the write-enable signal on control bus 1127, and apply the data on write-data bus 1134. Next, the volatile storage device 104 may: sense the write-enable signal that is applied on control bus 1127, sense the data that is applied on write-data bus 1134, sense the destination address that is applied on address bus 1136. And finally, the volatile storage device 104 may store the data at the destination address, thus completing the write operation. Although this example describes a the performance of actions in a sequence, it will be clear to those of ordinary skill in the art, after reading this disclosure, that alternative implementations are possible in which at least some of the actions are performed in a different order or altogether omitted.

The execution of a read operation on the volatile storage device 104 is now described in further detail. When the controller 1102 attempts to retrieve data from a source address in the volatile storage device 104, the controller 1102 may: apply a read-enable signal on control bus 1126 and apply an source address from which the data is desired to be retrieved on address bus 1124. Next. the memory read/write logic 1104 may: sense the source address that is applied on address bus 1124, sense the read-enable signal that is applied on control bus 1126, apply the source address on address bus 1136, and apply the read-enable signal on control bus 1127. Next, the volatile storage device 104 may: sense the read-enable signal that is applied on control bus 1127, sense the source address that is applied on address bus 1136, retrieve data from the source address, and apply the retrieved data on read-data bus 1132. Next, the memory read/write logic 1104 may: sense the data that is applied on read-data bus 1132 and apply the data on read-data bus 1120. And finally, the controller 1102 may receive the data that is applied on the read-data bus 1120, thus completing the read operation. Although this example describes a the performance of actions in a sequence, it will be clear to those of ordinary skill in the art, after reading this disclosure, that alternative implementations are possible in which at least some of the actions are performed in a different order or altogether omitted.

The execution of a write operation on the non-volatile storage device 102 is now described in further detail. When the controller 1102 attempts to store data at a destination address in the non-volatile storage device 102, the controller 1102 may: apply a write-enable signal on control bus 1126, apply the data on write-data bus 1122, and apply the destination address on address bus 1124. Next, the memory read/write logic 1104 may: sense the destination address that is applied on address bus 1124, sense the data that is applied on the write-data bus, sense the write-enable signal that is applied on control bus 1126, apply the destination address on address bus 1136, apply the write-enable signal on control bus 1127, and apply the data on write-data bus 1142. Next, the error correction logic 1108 may: receive the data that is applied on the write-data bus 1142, generate an error code for the data, append the error code to the data to produce a data packet, and apply the data packet on write-data bus 1144. Next, the hash encode logic 1110 may: sense the destination address that is applied on address bus 1136, sense the data packet that is applied on write-data bus 1142, identify a hashing vector based on the destination address, encode the data packet based on the hashing vector to produce an encoded data packet, and apply the encoded data packet on write-data bus 1146. And finally, the non-volatile storage device 102 may sense the destination address that is applied on address bus 1136, sense the encoded data packet that is applied on write-data bus 1146, and store the encoded data packet at the destination address, thus completing the write operation. Although this example describes a the performance of actions in a sequence, it will be clear to those of ordinary skill in the art, after reading this disclosure, that alternative implementations are possible in which at least some of the actions are performed in a different order or altogether omitted.

The execution of a copy operation on the non-volatile storage device 102 is now described in further detail. When the controller 1102 attempts to copy data from the non-volatile storage device 102 to the volatile storage device 104, the controller 1102 may: apply a read-enable signal on control bus 1126 and apply a source address on address bus 1124. Next, the memory read/write logic 1104 may: sense the destination address that is applied on the address bus 1124, sense the read-enable signal that is applied on control bus 1126, apply the read-enable signal on address bus 1136, and apply the read-enable signal on control bus 1127. Next, the non-volatile storage device 102 may: sense the read-enable signal that is applied on control bus 1127, sense the source address that is applied on address bus 1136, and return data that is stored at the source address on read-data bus 1148. Next, the hash decode logic 1112 may: sense the data applied on read-data bus 1148, sense the destination address that is applied on address bus 1136, identify a hashing vector that is associated with the destination address, decode the data by using the hashing vector to obtain decoded data, and apply the decoded data on read-data bus 1150. Although this example describes a the performance of actions in a sequence, it will be clear to those of ordinary skill in the art, after reading this disclosure, that alternative implementations are possible in which at least some of the actions are performed in a different order or altogether omitted.

Next, the error correction logic 1108 may: sense the decoded data on read-data bus 1150, extract the last N bits (e.g., the last 6 bits) of the decoded data, and perform an error check on the rest of the decoded data by using the last N bits being used as the error code. As discussed above, when "incorrect" data is returned by the non-volatile storage device 102 as a result of a fault on address bus 1136 (or address bus 1124), the last N bits of the decoded data would not constitute a valid error code for the rest of the decoded data, which in turn would cause the rest of the decoded data to fail the error check. As noted above, the rest of the decoded data (i.e., the decoded data sans the last N bits) may be a data item that is desired to be copied into the volatile storage device 104.

If the rest of the decoded data fails the error check, the error correction logic 1108 may output an error signal on error bus 1160, and the rest of the decoded data on read-data bus 1120. Next, the controller may sense that an error signal that is being applied on error bus 1160 and determine that the copy operation has failed. When the error signal is detected by the controller 1102, the controller 1102 may transition the sensor 100 into a safe state.

Otherwise, if the rest of the decoded data (e.g., a data item) passes the error check, the error correction logic 1108 may apply the rest of the decoded data on read-data bus 1152, without outputting an error signal. Next, the loading control logic 1114 may: sense the source address that is applied on the address bus 1136, and sense the rest of the decoded data (i.e., a data item) that is applied on read-data bus 1152, identify a destination address (in the volatile storage device 104) that is associated with the source address, apply the destination address on address bus 1164, and apply the rest of the decoded data (e.g., a data item) on the read-data bus 1162. And finally, the volatile storage device 104 may: sense the destination address on address bus 1164, sense the data on the data bus 1162, and store the data at the destination address, at which point the copy operation is completed successfully. Although this example describes a the performance of actions in a sequence, it will be clear to those of ordinary skill in the art, after reading this disclosure, that alternative implementations are possible in which at least some of the actions are performed in a different order or altogether omitted.

In some implementations, the loading control logic 1114 may be configured to maintain a mapping data structure that maps at least some of the addresses in the non-volatile storage device 102 to respective addresses in the non-volatile storage device. In such implementations, when data is read from one of the addresses in the non-volatile storage device 102, which are represented in the mapping data structure, that data may be automatically stored at an address in the volatile storage device 104 (that is mapped to the represented address by the mapping data structure), without the controller 1102 having to issue additional signals.

The execution of a read operation on the non-volatile storage device is now described further. The read operation may be performed in substantially the same manner as the copy operation, which is discussed above. The difference between "read" and "copy" operations is that data retrieved from the non-volatile storage device 102 is returned to the controller 1102 and is not copied directly into the volatile storage device 104 by the loading control logic 1114.

Specifically, when a read operation is attempted by the controller 1102, decoded data, which is returned by the non-volatile storage device, is provided to the error correction logic 1108. The error correction logic may: extract the last N bits (e.g., the last 6 bits of the decoded data), and subsequently carry an error check on the rest of the data by using the last N bits as an error code. If the rest of the decoded data fails the error check, the error correction logic 1108 may output an error signal on error bus 1160, and the rest of the decoded data on read-data bus 1120. Next, the controller may sense that an error signal is being applied on error bus 1160 and ignore the data that is being applied on read-data bus 1120 in response. Otherwise, if the rest of the decoded data passes the error check, the error correction logic 1108 may apply the rest of the decoded data on read-data bus 1152 without outputting an error signal, in which case the controller 1102 may determine that the read operation has been completed successfully, and begin using the data it is provided on read-data bus 1152.

FIGS. 1-11 are provided as an example only. For the sake of simplicity, the term "bus" is used to refer to any signal pathway in the processing circuitry 106. In this regard, it will be understood that the term "bus," is not limited to any specific signal pathway implementation. For example, when permitted by context, the term "bus," may refer to a conductor (or a metal trace) that connects two components to one another. However, depending on context, the term "bus" may also refer to a many-to-many signal path, which includes circuitry implementing collision detection, scheduling, and/or another similar channel-allocation mechanism. As used throughout the disclosure, the phrase "one-hot bit string shall refer to one of (i) a bit string in which only one bit is equal to '1' and all remaining bits are equal to '0' or (ii) a bit string in which only one bit is equal to '0' and all remaining bits are equal to 1. Although in the example of FIGS. 1-11 an address-specific hashing vector is used to encode data packets, it will be understood that any other suitable type code key may be used to encode the data packet. In this regard, it will be understood that the disclosure is not limited to using hashing vectors as address-specific coding keys. Furthermore, by way of example, the phrase "detecting whether a data item is corrupt" may refer to performing an error check on the data item and detecting whether the data item has failed the error check. Furthermore, although in the examples discussed above the size of the hashing vector is the same as the word size the non-volatile storage device, alternative implementations are possible in which the two sizes are different. Although the examples provided throughout the disclosure often refer to the storage of "factory data", it will be understood that the techniques disclosed herein are not limited to any specific type of data. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used throughout the disclosure, the term product may include a physical object that is being bought and sold, a service, and/or anything else that can be purchased and solved.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A sensor comprising:
a sensing element;
a volatile storage device;
a non-volatile storage device configured to store a plurality of encoded data packets, each of the encoded data packets being stored at a different respective address in an address space of the non-volatile storage device, at least some of the plurality of encoded data packets being encoded using a different one of a plurality of coding keys, any of the encoded data packets being encoded using a coding key that is associated with the respective address where the encoded data packet is stored; and
processing circuitry operatively coupled to the sensing element, the volatile storage device, and the non-volatile storage device, wherein the processing circuitry is configured to perform the operations of:
retrieving a first encoded data packet from a first address in the non-volatile storage device;
decoding the first encoded data packet to obtain a first data item and a first error code corresponding to the first data item, the first encoded data packet being decoded by using a first coding key that is associated with the first address;
detecting whether the first data item is corrupt based on the first error code and an error correction function,
storing the first data item at a first address in the volatile storage device when the first data item is not corrupt, and
transitioning the sensor into a safe state when the first data item is corrupt.

2. The sensor of claim 1, wherein the error correction function is arranged to yield an error when the first encoded data packet is decoded with an incorrect coding key.

3. The sensor of claim 1, wherein, in response to a power-on event that is generated within the sensor when the sensor is powered on, the processing circuitry stores the first data item at the first address in the volatile storage device.

4. The sensor of claim 1, wherein:
each of the coding keys includes a one-hot hashing vector, and
any of the addresses in the address space is associated with a different one-hot hashing vector.

5. The sensor of claim 1, wherein:
any of the coding keys includes a one-hot hashing vector,
at least two of addresses in the address space are associated with the same one-hot hashing vector, and
a Hamming distance between any two addresses in the address space that are associated with the same one-hot hashing vector is greater than one.

6. The sensor of claim 1, wherein the processing circuitry is further configured to perform the operations of:
retrieving a second encoded data packet from a second address in the non-volatile storage device;
decoding the second encoded data packet to obtain a second data item and a second error code corresponding to the second data item, the second encoded data packet being decoded by using a second coding key that is associated with the second address;
detecting whether the second data item is corrupt based on the second error code and the error correction function, and
storing the second data item at a second address in the volatile storage device when the second data item is not corrupt.

7. The sensor of claim 1, wherein:
the processing circuitry is configured to implement processing logic for: sampling one or more sensor signals that are generated by the sensing element, and processing the sampled sensor signals based on the first data item to produce an output signal; and
the first data item includes factory data that is used in generating the output signal, and which is designated for storage at the first address in the volatile storage device by the processing logic.

8. A method for use in an electronic device having a non-volatile storage device and a volatile storage device, the method comprising:
retrieving a first encoded data packet from a first address in the non-volatile storage device;
decoding the first encoded data packet to obtain a first data item and a first error code corresponding to the first data item, the first encoded data packet being decoded by using a first coding key that is associated with the first address;
detecting whether the first data item is corrupt based on the first error code and an error correction function,
storing the first data item at a first address in the volatile storage device when the first data item is not corrupt, and
transitioning the electronic device into a safe state when the first data item is corrupt.

9. The method of claim 8, wherein the non-volatile storage device is configured to store a plurality of encoded data packets, each of the encoded data packets being stored at a different respective address in an address space of the non-volatile storage device, at least some of the plurality of encoded data packets being encoded by using a different one of a plurality of coding keys, any of the encoded data packets being encoded using a coding key that is associated with the respective address where the encoded data packet is stored.

10. The method of claim 8, wherein the error correction function is arranged to yield an error when the first encoded data packet is decoded with an incorrect coding key.

11. The method of claim 8, wherein the first data item is stored at the first address in the volatile storage device in response to a power-on event that is generated within the electronic device when the electronic device is powered on.

12. The method of claim 8, wherein:
any of the coding keys includes a one-hot hashing vector, and
any of the addresses in an address space of the non-volatile storage device are associated a different one-hot hashing vector.

13. The method of claim 8, wherein:
any of the coding keys includes a one-hot hashing vector,
at least two of addresses in an address space of the non-volatile storage device are associated with the same one-hot hashing vector, and
a Hamming distance between any two addresses in the address space that are associated with the same one-hot hashing vector is greater than one.

14. The method of claim 8, further comprising:
retrieving a second encoded data packet from a second address in the non-volatile storage device;
decoding the second encoded data packet to obtain a second data item and a second error code corresponding to the second data item, the second encoded data packet being decoded by using a second coding key that is associated with the second address;
detecting whether the second data item is corrupt based on the second error code and the error correction function, and
storing the second data item at a second address in the volatile storage device when the second data item is not corrupt.

15. A non-transitory computer-readable medium storing one or more instructions, which when executed by a processing circuitry of an electronic device cause the processing circuitry to perform the operations of:
retrieving a first encoded data packet from a first address in a non-volatile storage device;
decoding the first encoded data packet to obtain a first data item and a first error code corresponding to the first data item, the first encoded data packet being decoded by using a first coding key that is associated with the first address;
detecting whether the first data item is corrupt based on the first error code and an error correction function,
storing the first data item at a first address in a volatile storage device when the first data item is not corrupt, and
transitioning the electronic device into a safe state when the first data item is corrupt.

16. The non-transitory computer-readable medium of claim 15, wherein the non-volatile storage device is configured to store a plurality of encoded data packets, each of the encoded data packets being stored at a different respective address in an address space of the non-volatile storage device, at least some of the plurality of encoded data packets being encoded by using different a different one of a plurality of coding keys, any of the encoded data packets being encoded using a coding key that is associated with the respective address where the encoded data packet is stored.

17. The non-transitory computer-readable medium of claim 15, wherein the error correction function is arranged to yield an error when the first encoded data packet is decoded with an incorrect coding key.

18. The non-transitory computer-readable medium of claim 15, wherein, in response to a power-on event that is generated when the electronic device is powered on, the processing circuitry stores the first data item at the first address in the volatile storage device.

19. The non-transitory computer-readable medium of claim 15, wherein:
each of the coding keys includes a one-hot hashing vector,
at least two of addresses in an address space of the non-volatile storage device are associated with the same one-hot hashing vector, and
a Hamming distance between any two addresses in the address space that are associated with the same one-hot hashing vector is greater than one.

20. The non-transitory computer-readable medium of claim 15, wherein the instructions, when executed by the processing circuitry, further cause the processing circuitry to perform the operations of:
retrieving a second encoded data packet from a second address in the non-volatile storage device;
decoding the second encoded data packet to obtain a second data item and a second error code corresponding to the second data item, the second encoded data packet being decoded by using a second coding key that is associated with the second address;
detecting whether the second data item is corrupt based on the second error code and the error correction function, and
storing the second data item at a second address in the volatile storage device when the second data item is not corrupt.

* * * * *

UNITED STATES PATENT AND TRADEMARK OFFICE
CERTIFICATE OF CORRECTION

PATENT NO. : 11,169,877 B2
APPLICATION NO. : 16/821155
DATED : November 9, 2021
INVENTOR(S) : Nicolas Rigoni et al.

Page 1 of 2

It is certified that error appears in the above-identified patent and that said Letters Patent is hereby corrected as shown below:

In the Specification

Column 4, Line 19 delete "FIG. 2 is flowchart" and replace with --FIG. 2 is a flowchart--.

Column 5, Line 21 delete "storing factory" and replace with --storing the factory--.

Column 6, Line 11 delete "FIG. 4 is schematic" and replace with --FIG. 4 is a schematic--.

Column 6, Line 17 delete "address the" and replace with --address in the--.

Column 6, Line 23 delete "is a XOR-ed" and replace with --is XOR-ed--.

Column 6, Line 46 delete "decoded would" and replace with --decoded data would--.

Column 9, Lines 18-19 delete "read/read write" and replace with --read/write--.

Column 10, Line 33 delete "a the" and replace with --the--.

Column 10, Line 44 delete "an source" and replace with --any source--.

Column 10, Line 59 delete "a the" and replace with --the--.

Column 11, Line 26 delete "a the" and replace with --the--.

Column 11, Line 53 delete "a the" and replace with --the--.

Column 12, Line 30 delete "a the" and replace with --the--.

Column 13, Line 5 delete "it is" and replace with --is--.

Signed and Sealed this
Twenty-fifth Day of July, 2023

Katherine Kelly Vidal
*Director of the United States Patent and Trademark Office*

CERTIFICATE OF CORRECTION (continued)
U.S. Pat. No. 11,169,877 B2

Column 13, Line 21 delete "1." and replace with --'1.'--.

Column 13, Line 32 delete "size the" and replace with --size of the--.

Column 18, Line 7 delete "different a different one" and replace with --a different one--.